Figure 1:
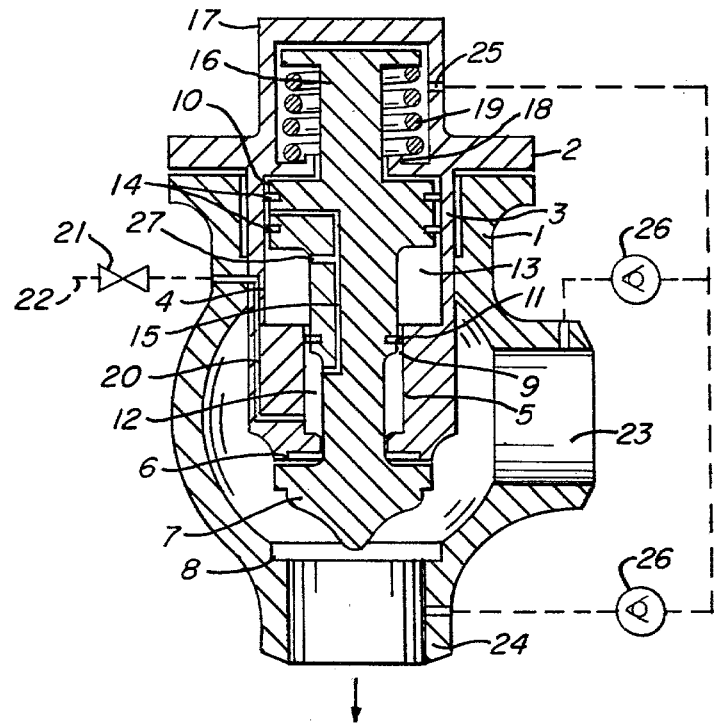

United States Patent [19]

Hafele

[11] 4,309,021

[45] Jan. 5, 1982

[54] VALVE STRUCTURE

[76] Inventor: Carl H. Hafele, Bergstrasse 83, 4050 Monchengladbach, Fed. Rep. of Germany

[21] Appl. No.: 21,060

[22] Filed: Mar. 16, 1979

[30] Foreign Application Priority Data

Mar. 18, 1978 [DE] Fed. Rep. of Germany ....... 2811879

[51] Int. Cl.³ .......................................... F16K 31/122
[52] U.S. Cl. ........................................ 251/26; 251/36
[58] Field of Search ...................... 251/36, 47, 50, 51, 251/44; 92/82, 86, 86.5

[56] References Cited

U.S. PATENT DOCUMENTS

| 506,221 | 10/1893 | Gilcher | 251/51 |
|---|---|---|---|
| 1,260,100 | 3/1918 | Udell | 92/86.5 |
| 1,846,483 | 2/1932 | Gilbert | 251/51 |
| 1,874,793 | 8/1932 | Nightingale et al. | 251/50 |
| 2,250,464 | 7/1941 | Boynton | 251/51 |
| 2,329,001 | 9/1943 | Robinson | 251/36 |
| 2,480,712 | 8/1949 | Carbon | 251/44 |
| 2,532,123 | 11/1950 | Shafer | 251/36 |
| 3,063,423 | 11/1962 | Riordan | 92/86 |
| 3,177,861 | 4/1965 | Quillian, Jr. | 92/86 |
| 3,862,738 | 1/1975 | Stumpmeier | 251/44 |
| 4,149,565 | 4/1979 | Jennings et al. | 251/44 |

Primary Examiner—Martin P. Schwadron
Assistant Examiner—G. L. Walton
Attorney, Agent, or Firm—Thomas H. Murray

[57] ABSTRACT

A valve of the type which is actuated under the pressure of the medium it controls and in which axially-aligned actuating and damping pistons are disposed within cylindrical relief and damping chambers and are connected to a valve element engageable with a valve seat disposed between inlet and outlet valve ports. The actuating piston acts under the pressure of the medium it controls to actuate the valve element in response to a reduction in pressure in the relief chamber. The invention itself resides in the provision of a restricted passageway which interconnects the relief and damping chambers whereby the pressure in the damping chamber will be reduced slowly in response to a reduction in pressure in the relief chamber whereby, if the valve should stick or otherwise become slow-acting, the pressure within the damping chamber will assist and insure that the valve is actuated even though it may not be in the best operating condition.

3 Claims, 2 Drawing Figures

U.S. Patent  Jan. 5, 1982  4,309,021

VALVE STRUCTURE

BACKGROUND OF THE INVENTION

As is known, ON-OFF valves for compressible fluid media have been provided in the past which are actuated by the pressure of the fluid they control, the valve spool being connected to an actuating piston movable within a cylindrical relief chamber and to a damping piston, usually coaxial with the actuating piston, reciprocable in a cylindrical damping chamber. The actuating piston is subjected to the pressure of the compressible medium controlled by the valve to actuate the valve in response to a reduction in pressure in the aforesaid relief chamber in which the actuating piston reciprocates.

Various constructions of valves of this type are known. They are used as either quick-closing valves serving to shut off sections of a pipeline in the event of dangerous operating conditions arising, such as line breaks or the like, or as quick-opening valves responding to excess pressure. Forces for actuating the valve can be produced by an actuating piston which experiences either the pressure of the flow medium itself or a reduction in such pressure.

Since valves of this type are primarily used for safety purposes, they must be very reliable in operation. It is for this reason that such valves are often of a size and design to insure that the forces which actuate them are much larger than necessary so that the valve operates satisfactorily even when the valve spool or the like has a tendency to stick or becomes difficult to move for any reason once the valve has been in use for a period of time.

SUMMARY OF THE INVENTION

It is an object of the present invention to insure that in the event that a valve of the type which has a tendency to stick or otherwise become difficult to move after a period of time, additional forces will automatically become effective to enhance the normal valve operating force and thus make it possible for the valve to operate under conditions where it might not otherwise operate under conditions where it might not otherwise operate after an extended period of use.

In accordance with the invention, a valve is provided of the type in which axially-aligned actuating and damping pistons are disposed within cylindrical relief and damping chambers, respectively, and are connected to a valve element engageable with a valve seat disposed between inlet and outlet valve ports. Typically, the actuating piston, the damping piston and the valve element, comprising the valve spool, are coaxial and housed within a common valve body. Forces exerted on the valve spool by the fluid within the relief and damping chambers are equalized under normal operating conditions. However, by reducing the pressure in the relief chamber, the valve can be actuated to assume either an open or closed condition, depending upon the particular design of the valve. In the usual case, the pressure within the damping chamber remains relatively constant when the valve is actuated, actuation of the valve being totally dependent upon a reduction in pressure in the relief chamber. A restricted passage, however, interconnects the relief and damping chambers such that, while the pressure in the damping chamber will not be reduced during a normal valve actuation, it will be reduced slowly and will assist in the valve actuation in the event of a sticking or otherwise difficult-to-operate valve condition. In this manner, and in the event of sticking or otherwise unsatisfactory operation of the valve when the normal actuating forces cannot move the spool satisfactorily, the damping chamber is used as an additional relief chamber (i.e., the effective surface area presented to the fluid medium is increased by the effective surface area of the damping piston, in addition to that of the actuating piston). Appropriate dimensioning of the restricted passageway assures that the damping chamber will come into operation as an additional relief chamber only when the valve has failed to operate after the normal actuation time period.

In an advantageous embodiment of the invention, the damping piston and relief piston are coaxial, stepped pistons, the damping piston being of larger diameter than the relief piston, and the damping chamber being separated from the relief chamber by a sealing element in the form of a piston ring disposed on the periphery of the relief piston. A second pair of piston rings surrounds the damping piston to form an annular gap which is connected to the relief chamber through the aforesaid restricted passageway. The provision of a direct connection from the annular gap between the aforesaid piston rings on the damping piston to the relief chamber insures that high-pressure fluid will not be transferred from the high-pressure side of the valve to the damping chamber, a condition which would inhibit the required pressure relief of the damping chamber. The invention can be carried into effect in a valve having substantially leak-free piston rings or one in which the piston rings permit a certain amount of leakage, depending upon requirements.

Preferably, the aforesaid restricted passageway connecting the relief and damping chambers incorporates a variable restriction, whereby flow through the restriction can be controlled as well as the operating time of the valve.

Figure 2:
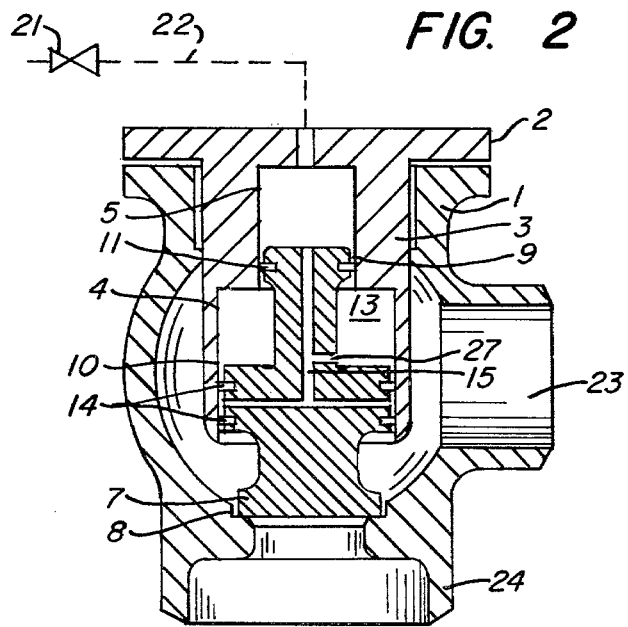

The above and other objects and features of the invention will become apparent from the following detailed description taken in connection with the accompanying drawings which form a part of this specification and in which:

FIG. 1 is a cross-sectional view, in elevation, of one embodiment of the invention wherein the valve is a quick-closing valve; and FIG. 2 is an elevational cross-sectional view of another embodiment of the invention wherein the valve comprises a quick-opening valve.

With reference now to the drawings, and particularly to FIG. 1, the valve shown includes a valve body or casing 1 and an upper cover 2 which is secured to the main valve body 1 by means of screws or bolts, not shown. Depending downwardly from the cover 2 is a cylindrical valve insert 3 which receives the valve operating elements about to be described.

Formed in the insert 3 is upper or first cylindrical cavity 4 and a communicating lower cylindrical cavity 5 at a smaller diameter. The bottom termination of the insert 3 is in the form of a projection having a surface 6 adapted to abut the upper periphery of a valve element 7. When the valve is in a closed position, a sealing surface on valve element 7 engages annular valve seat 8 formed in the body 1.

Valve element 7 is part of a valve spool which includes actuating piston 9 coaxial with and connected to a larger diameter damping piston 10. Piston 9 is reciprocable within the cylinder 5 and is surrounded by piston ring 11 which abuts the walls of the cylinder 5. The piston ring 11 separates two operating chambers (i.e., the relief chamber 12 and damping chamber 13) one from the other but at the same time can permit a certain amount of leakage from one chamber to the other.

In a similar manner, the piston 10 is provided with two spaced piston rings 14 separated by an annular gap between the periphery of the piston and the periphery of chamber 4. A passageway 15 of restricted cross section is formed in the adjoining pistons 9 and 10 and extends from the annular gap formed between the piston rings 14 to the relief chamber 12. Projecting upwardly from the upper surface of the piston 10 is a cylindrical projection 16 which terminates in a flanged portion 17. A helical compression spring 19 is disposed between flange 17 and annular shoulder 18 formed in the cover 2 and acts to hold the valve element 7 in an open position wherein it is separated from the valve seat 8.

The valve body 1 is provided with a valve inlet port 23 and a valve outlet port 24 between which is the valve seat 8. Auxiliary lines which extend from the inlet port 23 and the outlet port 24 are shown in broken lines in the drawing and are connected to a bore 25 in the cover 2. These auxiliary lines or conduits insure that the space above the damping piston is filled with the medium controlled by the valve at the maximum operating pressure. Check valves 26 in the auxiliary conduits insure that, when the valve is in a closed condition, there can be no transfer of fluid from the inlet port 23 to the outlet port 24.

Formed in the outer wall of the valve insert 3 is a discharge duct 20 which communicates with the relief chamber 12 and is connected at its other end through control valve 21 to a low pressure conduit 22. The passageway 15 formed in the pistons 9 and 10 is connected through a transverse duct 27 to the damping chamber 13. In this way, it will be appreciated that the damping chamber 13 and the relief chamber 12 are in communication with each other. Preferably, the duct 27 is provided with a variable restriction, not shown, which enables the issuing quantity of fluid medium to be varied as well as the closing time of the valve.

Operation of the valve shown in FIG. 1 is as follows: When the valve is open, all of its internal chambers are accessible to the flow medium and are at the pressure existing at the valve inlet 23. This occurs, as regards chambers 12 and 13, by virtue of a certain amount of leakage around the piston rings 11 and 14 as explained above. In order to close the valve, the control valve 21 is opened, thereby reducing the pressure in the relief chamber 12. Under these conditions, the upward force on the valve spool is less than the downward force exerted by the fluid passing into the valve body through port 25. As a result, the valve spool including valve element 7 are moved rapidly from an opened position to a closed position. The closing operation is damped since the movement of the damping piston reduces the volume of the compressible medium in the damping chamber 13. When the valve is in proper working order, and because of the relatively short actuation time, there is no appreciable relief of the damping chamber via the passageway 15 during normal operation.

On the other hand, if the valve has become difficult to move after a prolonged period of operation, such that the closing force arising from the normal pressure difference is insufficient to actuate the valve, fluid will be transferred from the damping chamber 13 to the relief chamber 12 via the clearance around the piston ring 11 and via the bore 27 and duct 15. As a result, the pressure in the damping chamber 13 drops slowly but surely to the pressure in relief chamber 12. The differential force acting to close the valve correspondingly increases and causes the valve to close. This feature insures that sufficient reserves of closing force are present when, after prolonged operation, the spool valve does not move as readily as previously.

The size and design of the duct passageway 15 is such that after the valve 21 has opened, pressure in the annular gap between the piston rings 14 decreases to the pressure in the relief chamber 12, such that fluid cannot pass from the chamber above the damping piston 10 into damping chamber 13 in normal operation, nor in conditions of operation of reduced effectiveness.

The bore 27, which comprises a restriction of variable cross section as described above, provides a means for controlling the time for pressure equalization between the damping chamber and the relief chamber 12 when there is a tendency of the spool valve to stick and in addition, it can control the speed of closure during normal or abnormal conditions of operation.

FIG. 2 shows another embodiment of the invention as applied to a quick-opening valve. Since many of the elements in FIG. 2 correspond to those of FIG. 1, they are identified by like reference numerals. Operation as regards adding the damping chamber 13 as a relief chamber in order to increase the actuating force (which in the case of FIG. 2 is the opening force) is the same as for the quick-closing valve shown in FIG. 1. That is, when the valve element or spool tends to stick, fluid from damping chamber 13 flows to the relief chamber defined by the cylinder 5 through restriction 27 and through the valve 21. As in the embodiment of FIG. 1, the restricted orifice 27 comprises a means for varying the opening time for the quick-opening valve of FIG. 2. Aside from this, the relationship between the operative surfaces of the stepped piston and spool arrangement in FIG. 2 is the same as that in FIG. 1 in that adequate opening force reserves are available, thus assuring that the valve can operate reliably even though it is not in particularly good operating condition.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. An on/off valve for use with compressible fluids, actuated by the fluid which it controls, said valve including axially aligned first and second chambers;
 a first piston in said first chamber;
 a second piston in said second chamber;
 said first and second pistons being mounted on a common valve spool;
 said first chamber and said first piston defining an operating chamber;
 said first chamber and said first piston defining an annular damping chamber about said second piston;
 said second chamber and said second piston defining a relief chamber;
 operating means for said valve comprising a valved fluid passageway extending from said relief chamber to permit reduction of fluid pressure in said relief chamber;

a first fluid passageway in said valve spool directly connecting said damping chamber and said relief chamber to permit the pressure in said damping chamber to be slowly reduced in response to a reduction in pressure in said relief chamber;

at least two axially-spaced piston rings between said first piston and said first cylinder, and including a second fluid passageway through said valve spool connecting the space between said piston rings to said relief chamber whereby fluid from the operating chamber may leak into the relief chamber, and resilient means acting on the first piston to maintain the valve in a normally open position and means for introducing the highest fluid pressure into the operating chamber from the valve inlet or outlet.

2. A normally open on/off valve for use with compressible fluids, actuated by the fluid which it controls, said valve having axially aligned first and second communicating cylinders;

a first piston in said first chamber;

a second piston in said second chamber;

said first and second pistons being carried on a common valve spool;

said valve spool extended through said second chamber to terminate in a valve element and extended through said first chamber to terminate in a projection;

resilient means for urging said projecting away from said first chamber;

said first chamber defining an annular damping chamber between the said first piston and the center of said valve and further defining an operating chamber between said first piston and said projection;

leakage means for said fluid from said operating chamber past said first piston into said annular damping chamber;

said second chamber defining an annular relief chamber between said second piston and said valve element;

a fluid inlet and a fluid outlet;

valve seat means opposing said valve element between said inlet and said outlet;

unidirectional fluid passageways for introducing said fluid from said inlet to said operating chamber and from said outlet to said operating chamber, whereby the highest fluid pressure from said unidirectional fluid passageways enters said operating chamber enlarging the said operating chamber and advancing the said valve spool toward said valve seat means to close said valve;

a fluid bleed passageway extending from said relief chamber outside said valve for releasing the fluid from said relief chamber and for closing said valve element;

a damping fluid passageway within said valve spool directly connecting said damping chamber and said relief chamber to permit the pressure in said damping chamber to be slowly reduced in response to a reduction in pressure in said relief chamber.

3. The improvement of claim 2 wherein the said damping fluid passageway has a variable restriction within said valve spool to vary the speed of operation of said valve.

* * * * *